United States Patent
Jin

(10) Patent No.: US 12,528,475 B2
(45) Date of Patent: Jan. 20, 2026

(54) VEHICLE CONTROL METHOD, VEHICLE AND CHIP

(71) Applicant: XIAOMI EV TECHNOLOGY CO., LTD., Beijing (CN)

(72) Inventor: Cheng Jin, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 163 days.

(21) Appl. No.: 18/240,035

(22) Filed: Aug. 30, 2023

(65) Prior Publication Data
US 2024/0391470 A1  Nov. 28, 2024

(30) Foreign Application Priority Data
May 24, 2023  (CN) .......................... 202310597482.2

(51) Int. Cl.
*B60W 40/114* (2012.01)
*B60W 30/095* (2012.01)

(52) U.S. Cl.
CPC ...... *B60W 40/114* (2013.01); *B60W 30/0953* (2013.01); *B60W 2554/802* (2020.02); *B60W 2554/804* (2020.02)

(58) Field of Classification Search
CPC .......... B60W 40/114; B60W 30/0953; B60W 2554/802; B60W 2554/804; B62D 7/1509; B62D 15/0265; B62D 7/159; B62D 6/003; B62D 6/002
USPC ......................................................... 701/41
See application file for complete search history.

(56) References Cited

U.S. PATENT DOCUMENTS

2023/0192184 A1* 6/2023 Solomon ................ B62D 7/159
                                                      701/41
2024/0166216 A1* 5/2024 Park ..................... B60W 40/13

FOREIGN PATENT DOCUMENTS

KR         101953132 B1 * 2/2019 ........... B62D 7/1509

OTHER PUBLICATIONS

European Patent Application No. 23198846.0 Search Report dated Apr. 5, 2024, 11 pages.

* cited by examiner

*Primary Examiner* — Scott A Reinbold
(74) *Attorney, Agent, or Firm* — Cozen O'Connor

(57) ABSTRACT

A vehicle control method includes: determining a target yaw rate of a vehicle when the vehicle meets a rear wheel turning control condition; acquiring a first yaw rate of the vehicle when a front wheel of the vehicle turns at a front-wheel maximum turning angle and a rear wheel of the vehicle turns at a rear-wheel maximum turning angle in a turning direction opposite to the front wheel, and a second yaw rate of the vehicle when the front wheel turns at the front-wheel maximum turning angle and the rear wheel does not turn; determining a magnitude relationship between the first yaw rate and the target yaw rate, and a magnitude relationship between the second yaw rate and the target yaw rate, respectively; and controlling the rear wheel of the vehicle according to whether the magnitude relationships meet a preset control condition.

3 Claims, 3 Drawing Sheets

VEHICLE CONTROL METHOD, VEHICLE AND CHIP

CROSS-REFERENCE TO RELATED APPLICATION

This application is based on and claims priority to Chinese Patent Application No. 202310597482.2 filed on May 24, 2023, the entire contents of which are incorporated herein by reference for all purposes.

BACKGROUND

In the prior art, a vehicle may use electronic power control to independently steer the rear wheels of the vehicle. When the vehicle drives at a low speed, the turning radius of the vehicle can be reduced by controlling the rear wheel and the front wheel to turn in opposite directions, so that the vehicle can easily steer in scenarios such as making a U-Turn. When the vehicle drives at a high speed, the stability of the vehicle during steering can be increased by controlling the rear wheel and the front wheel to turn in the same direction. The high and low speed thresholds of the vehicle may be set as required. However, in some scenarios, the electronic power control of the rear wheel turning will bring disadvantages. For example, in an emergency situation, if the vehicle speed is too high and the rear wheel turns in the same direction as the front wheel, the driving stability of the vehicle is improved, but the turning radius of the vehicle is increased, which may make it difficult for the vehicle to avoid a collision effectively.

SUMMARY

The present disclosure relates to a field of vehicle control, and in particular to a vehicle control method, a vehicle and a chip.

According to a first aspect of embodiments of the present disclosure, there is provided a vehicle control method, and the method includes: determining a target yaw rate of a vehicle when the vehicle meets a rear wheel turning control condition; acquiring a first yaw rate of the vehicle when a front wheel of the vehicle turns at a front-wheel maximum turning angle and a rear wheel of the vehicle turns at a rear-wheel maximum turning angle in a turning direction opposite to the front wheel, and a second yaw rate of the vehicle when the front wheel turns at the front-wheel maximum turning angle and the rear wheel does not turn; determining a magnitude relationship between the first yaw rate and the target yaw rate, and a magnitude relationship between the second yaw rate and the target yaw rate, respectively; and controlling the rear wheel of the vehicle according to whether the magnitude relationships meet a preset control condition.

According to a second aspect of embodiments of the present disclosure, there is provided a vehicle, and the vehicle includes: a processor; and a memory for storing instructions executable by the processor. The processor is configured to: determine a target yaw rate of a vehicle in response to determining that the vehicle meets a rear wheel turning control condition; acquire a first yaw rate of the vehicle in response to determining that a front wheel of the vehicle turns at a front-wheel maximum turning angle and a rear wheel of the vehicle turns at a rear-wheel maximum turning angle in a turning direction opposite to the front wheel, and a second yaw rate of the vehicle in response to determining that the front wheel turns at the front-wheel maximum turning angle and the rear wheel does not turn; determine a magnitude relationship between the first yaw rate and the target yaw rate, and a magnitude relationship between the second yaw rate and the target yaw rate, respectively; and control the rear wheel of the vehicle according to whether the magnitude relationships meet a preset control condition.

According to a third aspect of embodiments of the present disclosure, there is provided a chip, and the chip includes a processor and an interface. The processor is configured to: determine a target yaw rate of a vehicle in response to determining that the vehicle meets a rear wheel turning control condition; acquire a first yaw rate of the vehicle in response to determining that a front wheel of the vehicle turns at a front-wheel maximum turning angle and a rear wheel of the vehicle turns at a rear-wheel maximum turning angle in a turning direction opposite to the front wheel, and a second yaw rate of the vehicle in response to determining that the front wheel turns at the front-wheel maximum turning angle and the rear wheel does not turn; determine a magnitude relationship between the first yaw rate and the target yaw rate, and a magnitude relationship between the second yaw rate and the target yaw rate, respectively; and control the rear wheel of the vehicle according to whether the magnitude relationships meet a preset control condition.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and together with the description, serve to explain the principles of the present disclosure.

DETAILED DESCRIPTION

Reference will now be made in detail to illustrative embodiments, examples of which are illustrated in the accompanying drawings. When the following description refers to the drawings, unless otherwise indicated, the same numbers in different drawings indicate the same or similar elements. The illustrative embodiments described in the following description do not represent all embodiments consistent with the present disclosure. Rather, they are merely examples of devices and methods consistent with some aspects of the present disclosure as detailed in the appended claims.

It should be noted that all the actions of acquiring signals, information or data in the present disclosure are carried out under the premise of complying with the corresponding data protection laws and policies of the country where the present disclosure is and obtaining authorization from the corresponding device owner.

Figure 1:
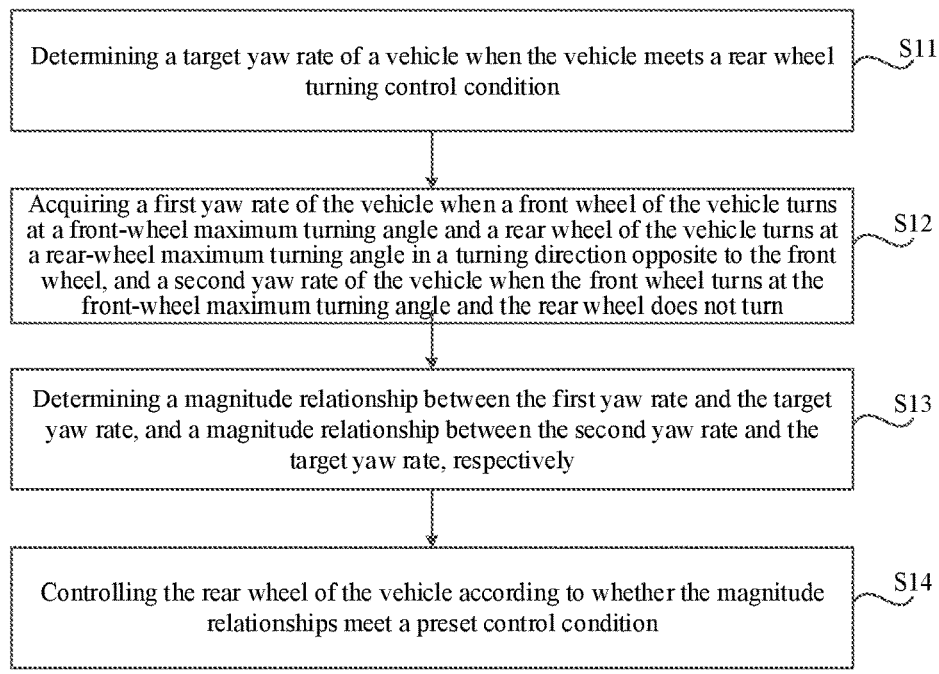
FIG. 1 is a flowchart of a vehicle control method according to an illustrative embodiment.

FIG. 1 is a flowchart of a vehicle control method according to an illustrative embodiment. As shown in FIG. 1, the method includes the following steps.

At step S11, a target yaw rate of a vehicle is determined when the vehicle meets a rear wheel turning control condition.

The rear wheel turning control condition includes: a current vehicle speed is within a preset speed range, a steering wheel rotation signal is received, and a transverse collision distance between the vehicle and a target obstacle is detected by a camera to be greater than zero.

It is worth noting that the preset speed range is determined according to vehicle stability parameters, aiming at ensuring the stability of the vehicle when the front and rear wheels are reversed. The vehicle stability parameters include at least one of a gross vehicle mass, front and rear wheel parameters, a vehicle wheelbase, chassis parameters and suspension parameters.

Further, the transverse collision distance between the vehicle and the target obstacle is the minimum distance by which the vehicle needs to move transversely to avoid collision with the target obstacle in the case of a turning direction of the vehicle. The turning direction of the vehicle is determined by a rotation direction of the steering wheel. For example, if the target obstacle appears in front of the vehicle and a driver controls the steering wheel to rotate rightwards, the vehicle steers right, and a transverse distance from the leftmost side of the vehicle to the rightmost side of the target obstacle measured by the camera is taken as the transverse collision distance. If the rightmost side of the target obstacle is located on a right side of the leftmost side of the front of the vehicle, the transverse collision distance is set to be greater than zero. If the rightmost side of the target obstacle is located on a left side of the leftmost side of the front of the vehicle, the transverse collision distance is set to be less than zero. If the rightmost side of the target obstacle and the leftmost side of the front of the vehicle are on the same line, the transverse collision distance is set to be equal to zero.

In an embodiment, the preset speed range is greater than 0 and less than or equal to 120 kph. For example, when the current vehicle speed of the vehicle is 100 kph, the current vehicle speed is within the preset speed range. When the target obstacle appears in left front of the vehicle during the driving of the vehicle, the driver controls the steering wheel to rotate rightwards. After the information that the steering wheel rotates rightwards is received, the camera detects that the transverse collision distance from the left side of the vehicle to the right side of the target obstacle is 0.3 m, and the left side of the vehicle is located on the left side of the right side of the target obstacle, so that it is determined that the transverse collision distance is greater than zero. Further, the target yaw rate required for the vehicle to avoid the target obstacle rightwards is calculated. When the target obstacle appears in right front of the vehicle, the driver controls the steering wheel to rotate leftwards. After the information that the steering wheel rotates leftwards is received, the camera detects that the transverse collision distance from the right side of the vehicle to the left side of the target obstacle is 0.3 m, and the right side of the vehicle is located on the right side of the left side of the target obstacle, so that it is determined that the transverse collision distance is greater than zero. Further, the target yaw rate required for the vehicle to avoid the target obstacle leftwards is calculated.

At step S12, a first yaw rate of the vehicle is acquired when the front wheel turns at a front-wheel maximum turning angle and the rear wheel turns at a rear-wheel maximum turning angle in a turning direction opposite to the front wheel, and a second yaw rate of the vehicle is acquired when the front wheel turns at the front-wheel maximum turning angle and the rear wheel does not turn.

The front-wheel maximum turning angle refers to an angle at which the front wheel turns left or right to the limit position respectively when the front wheel is in a straight driving position, and the magnitude of the front-wheel maximum turning angle affects a steering radius (i.e. a turning radius) when the vehicle steers or turns. The greater the front-wheel maximum turning angle, the smaller the steering radius, and the greater the yaw rate that can be provided for avoiding the collision. The front-wheel maximum turning angle may be adjusted by a limit device on a front axle of the vehicle. In an embodiment, the front-wheel maximum turning angle is between 30 degrees and 40 degrees.

The rear-wheel maximum turning angle refers to an angle at which the rear wheel turns left or right to the limit position respectively when the rear wheel is in the straight driving position. In order to ensure the stability of the vehicle, the rear-wheel maximum turning angle of the vehicle is smaller than the front-wheel maximum turning angle of the vehicle. In an embodiment, the rear-wheel maximum turning angle of the vehicle is between 3 degrees and 10 degrees.

It is worth noting that the turning radius of the vehicle is the smallest when the front wheel turns at the front-wheel maximum turning angle and the rear wheel turns at the rear-wheel maximum turning angle in the turning direction opposite to the front wheel. The turning radius of the vehicle is the largest when the front wheel turns at the front-wheel maximum turning angle and the rear wheel turns at the rear-wheel maximum turning angle in the same turning direction as the front wheel. When the front wheel turns at the front-wheel maximum turning angle and the rear wheel does not turn, the turning radius of the vehicle is smaller than that when the front and rear wheels of the vehicle turn in the same direction at their maximum turning angles, and larger than that when the front and rear wheels of the vehicle turn in opposite directions at their maximum turning angles. When only the turning angles of the front and rear wheels of the vehicle are considered, the larger the yaw rate, the smaller the turning radius of the vehicle. Thus, the first yaw rate is greater than the second yaw rate, and the second yaw rate is greater than a yaw rate that can be provided when the front and rear wheels of the vehicle turn in the same direction at their maximum turning angles.

At step S13, a magnitude relationship between the first yaw rate and the target yaw rate and a magnitude relationship between the second yaw rate and the target yaw rate are determined.

The target yaw rate is the minimum yaw rate that is required for the vehicle to avoid collision with the target obstacle. The magnitude relationship between the first yaw rate and the target yaw rate can determine whether the maximum yaw rate, which can be provided when the front and rear wheels of the vehicle turn in the opposite directions at their maximum turning angles, can prevent the vehicle from colliding with the target obstacle. If the target yaw rate is greater than or equal to the first yaw rate, it is determined that the collision between the vehicle and the target obstacle cannot be avoided, and in order to ensure the stability of the vehicle and the safety of the driver, the rear wheel of the vehicle is not reversely controlled. The magnitude relationship between the second yaw rate and the target yaw rate can determine whether the vehicle needs to provide a larger yaw rate by adjusting the rear wheel to turn in the direction opposite to the front wheel. If the target yaw rate is less than the second yaw rate, it is determined that it is not necessary to provide a larger yaw rate by adjusting the rear wheel to turn in the direction opposite to the front wheel. If the target yaw rate is less than the first yaw rate and the target yaw rate is greater than or equal to the second yaw rate, it is determined that it is necessary to provide a larger yaw rate by adjusting the rear wheel to turn in the direction opposite to the front wheel, so that the vehicle can avoid collision with the target obstacle.

At step S14, the rear wheel of the vehicle is controlled according to whether the magnitude relationships meet a preset control condition.

With the above solution, when the control condition for turning the rear wheel is met, it is determined whether the vehicle turns the rear wheel to avoid collision according to the magnitude relationships between the target yaw rate and the maximum yaw rates which can be provided when the rear wheel of the vehicle is in different turning states. In case of emergency collision, the turning control may be performed on the rear wheel of the vehicle, so that the collision of the vehicle during braking is more effectively avoided, and the safety of the vehicle is significantly improved.

In some embodiments, at step S14, controlling the rear wheel of the vehicle according to whether the magnitude relationships meet the preset control condition includes: obtaining a turning direction of the front wheel of the vehicle, and performing a turning control on the rear wheel of the vehicle at a preset rear-wheel turning angle in a direction opposite to the turning direction of the front wheel, when the magnitude relationships meet the preset control condition.

In an embodiment, if the rear-wheel maximum turning angle of the vehicle is 5 degrees, the preset rear-wheel turning angle is the rear-wheel maximum turning angle of the vehicle. Further, when the magnitude relationship between the first yaw rate and the target yaw, and the magnitude relationship between the second yaw rate and the target yaw rate meet the preset condition, respectively, if the front wheel of the vehicle is currently turning right, the rear wheel of the vehicle is controlled to turn left by 5 degrees. It may be explained that at this time, regardless of the turning angle of the front wheel, the rear wheel of the vehicle turns left by 5 degrees. Similarly, if the front wheel of the vehicle is currently turning left, the rear wheel of the vehicle is controlled to turn right by 5 degrees.

In another embodiment, the preset rear-wheel turning angle may be determined according to at least one of the current vehicle speed, the target yaw rate, the vehicle stability parameter and the transverse collision distance, and the preset rear-wheel turning angle is less than or equal to the rear-wheel maximum turning angle of the vehicle.

When the magnitude relationships do not meet the preset control condition, turning control is not performed on the rear wheel of the vehicle.

In some embodiments, the method includes the following step.

When the target yaw rate is less than the first yaw rate and the target yaw rate is greater than or equal to the second yaw rate, it is determined that the magnitude relationships meet the preset control condition.

For example, when the target yaw rate is less than the first yaw rate and the target yaw rate is greater than or equal to the second yaw rate, the turning direction of the front wheel of the vehicle is obtained, and the rear wheel of the vehicle is subject to the turning control at the preset rear-wheel turning angle in the direction opposite to the turning direction of the front wheel. For example, if the front wheel of the vehicle is currently turning right, the rear wheel of the vehicle is controlled to turn left by 5 degrees. If the front wheel of the vehicle is currently turning left, the rear wheel of the vehicle is controlled to turn right by 5 degrees.

When the target yaw rate is greater than or equal to the first yaw rate, or the target yaw rate is less than the second yaw rate, it is determined that the magnitude relationships do not meet the preset control condition.

For example, when the target yaw rate is greater than or equal to the first yaw rate, or the target yaw rate is less than the second yaw rate, no turning control is performed on the rear wheel of the vehicle. That is, when the target yaw rate is greater than or equal to the first yaw rate, or the target yaw rate is less than the second yaw rate, the rear wheel of the vehicle does not turn, no matter whether the front wheel of the vehicle turns left or right.

According to the above technical solution, by controlling the turning of the rear wheel of the vehicle, a transient response is added in the turning process, so that the turning radius of the vehicle is reduced on the premise of ensuring the stability of the vehicle, and the collision of the vehicle in the emergency obstacle avoidance process is effectively avoided.

Figure 2:
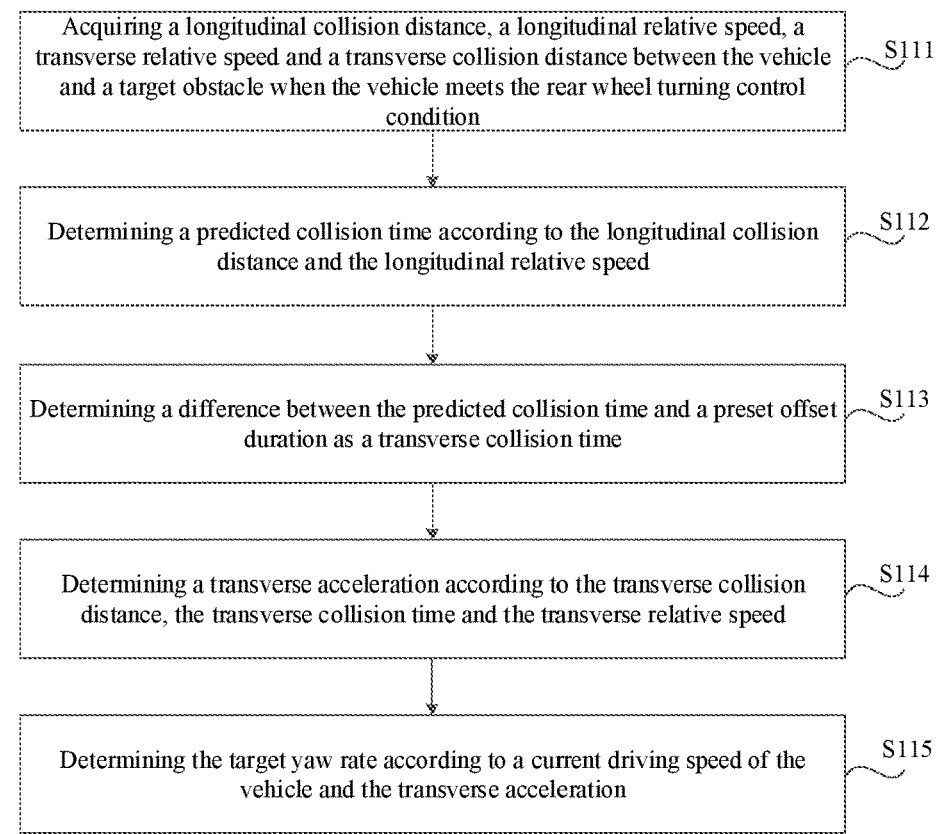
FIG. 2 is a flowchart for realizing step S11 in FIG. 1 according to an illustrative embodiment.

FIG. 2 is a flowchart for realizing step S11 in FIG. 1 according to an illustrative embodiment. At step S11, determining the target yaw rate of the vehicle when the vehicle meets the rear wheel turning control conditions includes the following steps.

At step S111, when the vehicle meets the rear wheel turning control condition, a longitudinal collision distance, a longitudinal relative speed, a transverse relative speed and the transverse collision distance between the vehicle and the target obstacle are acquired.

In an embodiment, the longitudinal collision distance, the longitudinal relative speed and the transverse relative speed between the vehicle and the target obstacle are acquired by sensors and radars. It is worth noting that the longitudinal collision distance, the longitudinal relative speed and the transverse relative speed between the vehicle and the target obstacle may be acquired by Adaptive Cruise Control (ACC).

In some embodiments, the transverse collision distance between the vehicle and the target obstacle is acquired by the camera installed at the front of the vehicle.

At step S112, a predicted collision time is determined according to the longitudinal collision distance and the longitudinal relative speed.

The quotient of the longitudinal collision distance divided by the longitudinal relative speed is determined as the predicted collision time.

For example, the predicted collision time is calculated according to the following formula:

$$TTC = \frac{d_S}{V_x}.$$

Here, TTC is the predicted collision time, ds is the longitudinal collision distance, and $V_x$ is the longitudinal relative speed.

At step S113, a difference between the predicted collision time and a preset offset duration is determined as a transverse collision time.

For example, the transverse collision time is calculated according to the following formula:

$$t = TTC - TimeOffset.$$

Here, t is the transverse collision time and TimeOffset is the preset offset duration.

It is worth noting that the preset offset duration is a calibration quantity, which is used to increase redundancy.

At step S114, a transverse acceleration is determined according to the transverse collision distance, the transverse collision time and the transverse relative speed.

For example, the transverse acceleration of the vehicle is calculated according to the following formula:

$$A_y = \frac{(d - V*t)*2}{t^2}.$$

Here, Ay is the transverse acceleration, d is the transverse collision distance, t is the transverse collision time, and V is the transverse relative speed between the vehicle and the target obstacle.

The transverse relative speed between the vehicle and the target obstacle is calculated by acquiring the current transverse speed of the vehicle, and in the embodiment of the present disclosure, the current transverse relative speed is calculated by the following formula:

$$V = V_0 + A_y * CycleTime.$$

Here, V is the transverse relative speed between the vehicle and the target obstacle, $V_0$ is the current transverse speed of the vehicle, and CycleTime is a preset measurement cycle time. CycleTime may be set to be 0.01 s.

It is worth noting that the transverse acceleration and the transverse relative speed can be solved by combining the above formulas for calculating the transverse acceleration and the transverse relative speed.

At step S115, the target yaw rate is determined according to a current driving speed of the vehicle and the transverse acceleration.

For example, the target yaw rate of the vehicle is calculated according to the following formula:

$$TarYawrate = \frac{A_y}{VehicleSpeed}.$$

Here, TarYawrate is the target yaw rate of the vehicle, and VehicleSpeed is the current driving speed of the vehicle.

Figure 3:
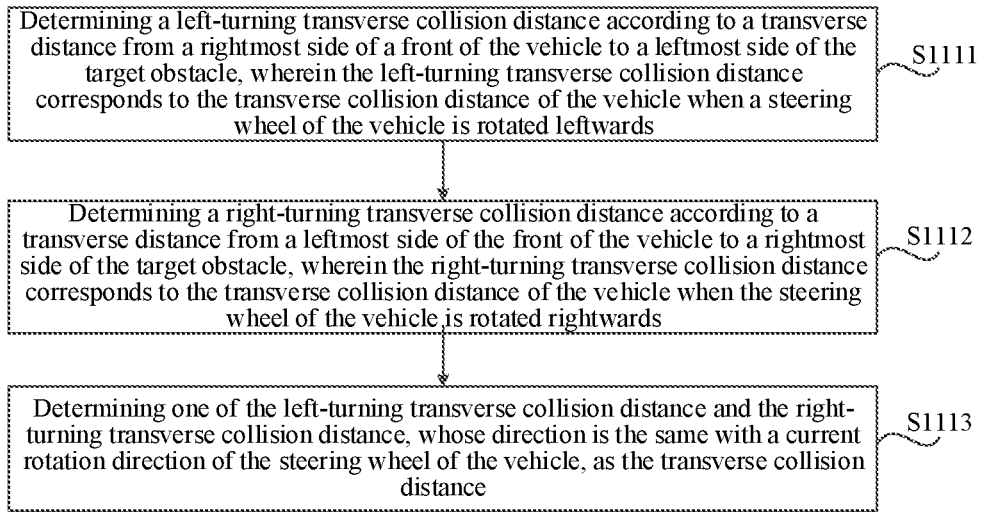
FIG. 3 is a flowchart for realizing sub-steps of step S111 in FIG. 2 according to an illustrative embodiment.

FIG. 3 is a flowchart for realizing sub-steps of step S111 in FIG. 2 according to an illustrative embodiment. At step S111, obtaining the transverse collision distance between the vehicle and the target obstacle includes the following steps.

At step S1111, according to a transverse distance from a rightmost side of the front of the vehicle to a leftmost side of the target obstacle, a left-turning transverse collision distance is determined, and the left-turning transverse collision distance corresponds to a collision distance of the vehicle when the steering wheel of the vehicle is rotated leftwards.

At step S1112, according to a transverse distance from a leftmost side of the front of the vehicle to a rightmost side of the target obstacle, a right-turning transverse collision distance is determined, and the right-turning transverse collision distance corresponds to a collision distance of the vehicle when the steering wheel of the vehicle is rotated rightwards.

At step S1113, one of the left-turning transverse collision distance and the right-turning transverse collision distance, whose direction is the same with a current rotation direction of the steering wheel of the vehicle among, is determined as the transverse collision distance.

For example, when the current rotation direction of the steering wheel of the vehicle is left, the left-turning transverse collision distance is determined as the transverse collision distance; when the current rotation direction of the steering wheel of the vehicle is right, the right-turning transverse collision distance is determined as the transverse collision distance.

In some embodiments, the vehicle control method further includes the following steps.

The rear wheel of the vehicle is controlled to return to a non-turning state, when the vehicle does not meet the rear wheel turning control condition, or when it is determined that the rotation direction of the steering wheel is the same with a direction of the turning control of the rear wheel, or when an oversteer signal is received.

When the vehicle does not meet the rear wheel turning control condition, controlling the rear wheel of the vehicle to return to the non-turning state includes the following steps.

When the current vehicle speed is not within the preset speed range, the rear wheel of the vehicle is controlled to return to the non-turning state. It is worth noting that when the vehicle speed is greater than the highest speed in the preset speed range, if the rear wheel of the vehicle is controlled to turn reversely relative to the front wheel of the vehicle, the vehicle tends to lose stability, thus causing the vehicle to roll over. Therefore, the rear wheel of the vehicle is controlled to return to the non-turning state, so as to ensure the driving safety of the vehicle.

In some embodiments, if the steering wheel rotation signal is not received, the rear wheel of the vehicle is controlled to return to the non-turning state. It is worth noting that if the steering wheel rotation signal is not received, the front wheel of the vehicle does not turn, so that the transverse collision direction of the vehicle cannot be judged and hence the transverse collision distance cannot be determined, thus the rear wheel of the vehicle is controlled to return to the non-turning state.

In some embodiments, if it is detected by the camera that the transverse collision distance between the vehicle and the target obstacle is less than or equal to zero, the rear wheel of the vehicle is controlled to return to the non-turning state.

It is worth noting that if the transverse collision distance is less than or equal to zero, it is determined that the vehicle has avoided collision with the target obstacle. For example, if the target obstacle is in left front of the vehicle and the vehicle steers right to undergo a possible collision, the right-turning collision distance is the transverse collision distance, that is, the transverse distance from the leftmost side of the front of the vehicle to the rightmost of the target obstacle is the transverse collision distance. If the leftmost side of the front of the vehicle is located on the right side of the rightmost side of the target obstacle, it indicates that the vehicle will not collide with the target obstacle in a straight driving state, and thus the transverse collision distance is set to be negative. If the leftmost side of the front of the vehicle is located on the left side of the rightmost side of the target obstacle, it indicates that the vehicle will collide with the target obstacle in the straight driving state, and thus the transverse collision distance is set to be positive. If the vehicle steers left to undergo a possible collision, the left-turning collision distance is the transverse collision distance. That is, the transverse distance from the rightmost side of the front of the vehicle to the leftmost side of the target obstacle is the transverse collision distance. If the leftmost side of the front of the vehicle is always located on the left side of the rightmost side of the target obstacle, the transverse collision distance is greater than zero. If the leftmost side of the front of the vehicle and the rightmost side of the target obstacle are on the same straight line, the transverse collision distance is set to be zero.

For another example, when the target obstacle is in right front of the vehicle, if the vehicle steers left to under a possible collision, the left-turning collision distance is the transverse collision distance, that is, the transverse distance from the rightmost side of the front of the vehicle to the leftmost side of the target obstacle is the transverse collision distance. If the rightmost side of the front of the vehicle is located on the left side of the leftmost side of the target obstacle, it indicates that the vehicle will not collide with the target obstacle in a straight driving state, and thus the transverse collision distance is set to be negative. If the rightmost side of the front of the vehicle is located on the right side of the leftmost side of the target obstacle, it indicates that the vehicle will collide with the target obstacle in the straight driving state, and thus the transverse collision distance is set to be positive. If the vehicle steers right to undergo a possible collision, the right-turning collision distance is the transverse collision distance, that is, the transverse distance from the leftmost side of the front of the vehicle to the rightmost side of the target obstacle is the transverse collision distance. If the rightmost side of the front of the vehicle is always located on the right side of the leftmost side of the target obstacle, the transverse collision distance is greater than zero. If the rightmost side of the front of the vehicle and the leftmost side of the target obstacle are on the same straight line, the transverse collision distance is set to be zero.

In some embodiments, when it is determined that the rotation direction of the steering wheel is the same with the direction of the turning control of the rear wheel, the rear wheel of the vehicle is controlled to return to the non-turning state.

For example, if the driver controls the steering wheel to rotate rightwards, the turning direction of the front wheel of the vehicle will be right, so that the vehicle steers right to undergo a possible collision. When the rear wheel of the vehicle turns reversely relative to the front wheel of the vehicle, the rear wheel of the vehicle turns left, and the turning direction of the rear wheel of the vehicle is opposite to the rotation direction of the steering wheel. If the driver controls the steering wheel to rotate leftwards at this moment, the turning direction of the front wheel of the vehicle is also left, and the rotation direction of the steering wheel is the same with the direction of the turning control of the rear wheel. Then, the rear wheel of the vehicle is controlled to return to the non-turning state.

In some embodiments, when the oversteer signal is received, the rear wheel of the vehicle is controlled to return to the non-turning state.

A steering state of the vehicle is detected by Electronic Stability Program (ESP), and it is determined whether the steering radius of the vehicle becomes smaller according to a theoretical steering radius and the steering radius of the vehicle. If the steering radius of the vehicle decreases to a preset value, the oversteer signal is sent.

In some embodiments, before determining the difference between the predicted collision time and the preset offset duration as the transverse collision time, the method further includes the following steps.

According to the driving speed, the preset offset duration is queried from the mapping relationship between a preset speed and an offset duration threshold.

The preset speed and the offset duration threshold have a one-to-one correspondence.

Figure 4:
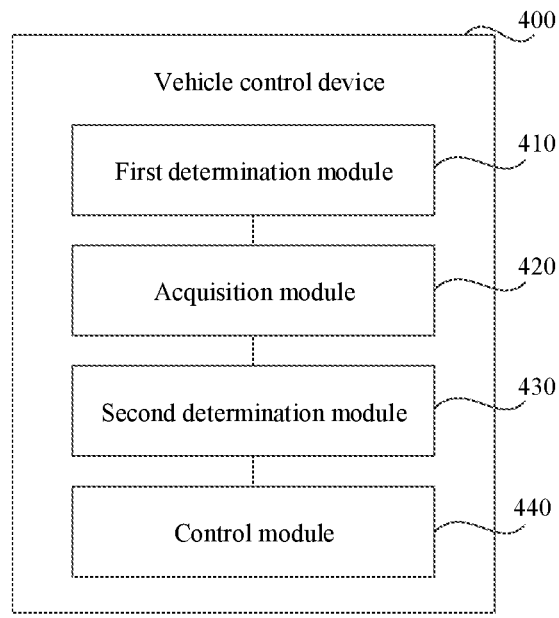
FIG. 4 is a block diagram of a vehicle control device according to an illustrative embodiment.

FIG. 4 is a block diagram of a vehicle control device according to an illustrative embodiment. Referring to FIG. 4, the vehicle control device 400 includes a first determination module 410, an acquisition module 420, a second determination module 430 and a control module 440.

The first determination module 410 is configured to determine a target yaw rate of a vehicle when the vehicle meets a rear wheel turning control condition.

The acquisition module 420 is configured to acquire a first yaw rate of the vehicle when a front wheel turns at a front-wheel maximum turning angle and a rear wheel turns at a rear-wheel maximum turning angle in a turning direction opposite to the front wheel, and a second yaw rate of the vehicle when the front wheel turns at the front-wheel maximum turning angle and the rear wheel does not turn.

The second determination module 430 is configured to determine a magnitude relationship between the first yaw rate and the target yaw rate, and a magnitude relationship between the second yaw rate and the target yaw rate, respectively.

The control module 440 is configured to control the rear wheel of the vehicle according to whether the magnitude relationships meet a preset control condition.

In some embodiments, the control module 440 includes: a first control submodule configured to acquire a turning direction of the front wheel of the vehicle, and to perform a turning control on the rear wheel of the vehicle at a preset rear wheel turning angle in a direction opposite to the turning direction of the front wheel, when the magnitude relationships meet the preset control condition; and a second control submodule configured to not perform turning control on the rear wheel of the vehicle when the magnitude relationships do not meet the preset control condition.

In some embodiments, the vehicle control device 400 includes: a first judgment module configured to determine that the magnitude relationships meet the preset control condition when the target yaw rate is greater than or equal to the first yaw rate and the target yaw rate is less than the second yaw rate; and a second judgment module configured to determine that the magnitude relationships do not meet the preset control condition when the target yaw rate is less than the first yaw rate or the target yaw rate is greater than or equal to the second yaw rate.

In some embodiments, the first determination module 410 includes: an acquisition submodule configured to acquire a longitudinal collision distance, a longitudinal relative speed, a transverse relative speed and a transverse collision distance between the vehicle and a target obstacle when the vehicle meets the rear wheel turning control condition; a first determination submodule configured to determine a predicted collision time according to the longitudinal collision distance and the longitudinal relative speed; a second determination submodule configured to determine a difference between the predicted collision time and a preset offset duration as a transverse collision time; a third determination submodule configured to determine a transverse acceleration according to the transverse collision distance, the transverse collision time and the transverse relative speed; and a fourth determination submodule configured to determine the target yaw rate according to a current driving speed of the vehicle and the transverse acceleration.

In some embodiments, the acquisition submodule includes: a first determination unit configured to determine a left-turning transverse collision distance according to a transverse distance from a rightmost side of a front of the vehicle to a leftmost side of the target obstacle, in which the left-turning transverse collision distance corresponds to the transverse collision distance of the vehicle when a steering wheel of the vehicle is rotated leftwards; a second determination unit configured to determine a right-turning transverse collision distance according to a transverse distance from a leftmost side of the front of the vehicle to a rightmost side of the target obstacle, in which the right-turning transverse collision distance corresponds to the transverse collision distance of the vehicle when the steering wheel of the vehicle is rotated rightwards; and a third determination unit configured to determine one of the left-turning transverse collision distance and the right-turning transverse collision distance, whose direction is the same with a current rotation direction of the steering wheel of the vehicle, as the transverse collision distance.

In some embodiments, the vehicle control device includes a recovery module configured to control the rear wheel of the vehicle to return to a non-turning state when the vehicle does not meet the rear wheel turning control condition, or when it is determined that the rotation direction of the steering wheel is the same with a direction of the turning control of the rear wheel, or when an oversteer signal is received.

In some embodiments, the second determination submodule is configured to query the preset offset duration from a mapping relationship between a preset speed and an offset duration threshold according to the driving speed.

With regard to the vehicle control device 400 in the above embodiments, the specific manner in which each module performs operations has been described in detail in the embodiment of the method, and will not be described in detail here.

The present disclosure also provides a vehicle, and the vehicle includes: a processor; and a memory for storing instructions executable by the processor. The processor is configured to realize the steps of the vehicle control method provided by the present disclosure when executing the executable instructions.

The present disclosure also provides a computer-readable storage medium, on which computer program instructions are stored. When the computer program instructions are executed by a processor, the steps of the vehicle control method provided by the present disclosure are realized.

The present disclosure also provides a chip, which includes a processor and an interface. The processor is configured to read instructions to execute the vehicle control method provided by the present disclosure.

Figure 5:
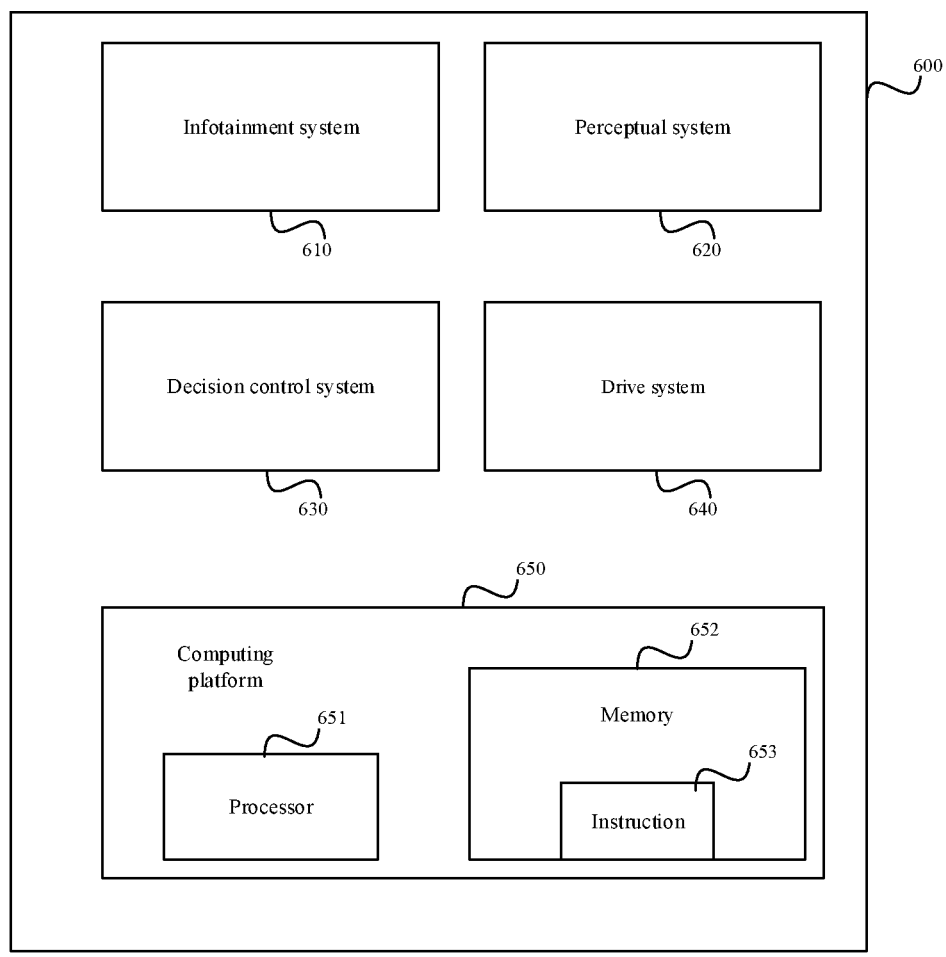
FIG. 5 is a functional block diagram of a vehicle according to an illustrative embodiment.

FIG. 5 is a block diagram of a vehicle 600 according to an illustrative embodiment. For example, the vehicle 600 may be a hybrid vehicle, a non-hybrid vehicle, an electric vehicle, a fuel cell vehicle or other types of vehicles. The vehicle 600 may be an autonomous vehicle, a semi-autonomous vehicle or a non-autonomous vehicle.

Referring to FIG. 5, the vehicle 600 may include various subsystems, such as an infotainment system 610, a perception system 620, a decision control system 630, a drive system 640, and a computing platform 650. The vehicle 600 may also include more or less subsystems, and each subsystem may include multiple components. In addition, the subsystems and the components of the vehicle 600 may be interconnected in a wired or wireless manner.

In some embodiments, the infotainment system 610 may include a communication system, an entertainment system, a navigation system and the like.

The sensing system 620 may include several sensors for sensing information of the environment around the vehicle 600. For example, the sensing system 620 may include a global positioning system (the global positioning system may be GPS system, BeiDou Navigation Satellite System or other positioning systems), an inertial measurement unit (IMU), a lidar, a millimeter-wave radar, an ultrasonic radar and a camera.

The decision control system 630 may include a computing system, a vehicle controller, a steering system, an accelerator and a braking system.

The drive system 640 may include components which provide power for movement for the vehicle 600. In an embodiment, the drive system 640 may include an engine, an energy source, a transmission system and wheels. The engine may be one or a combination of an internal combustion engine, an electric motor and an air compression engine. The engine can convert the energy provided by the energy source into the mechanical energy.

Some or all functions of the vehicle 600 are controlled by the computing platform 650. The computing platform 650 may include at least one processor 651 and a memory 652, and the processor 651 may execute instructions 653 stored in the memory 652.

The processor 651 may be any conventional processor, such as a commercially available CPU. The processor may also include, for example, a Graphic Process Unit (GPU), a Field Programmable Gate Array (FPGA), a System on Chip (SOC), an Application Specific Integrated Circuit (ASIC) or a combination thereof.

The memory 652 may be realized by any type of volatile or nonvolatile memory device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

In addition to the instruction 653, the memory 652 may also store data, such as a road map, route information, a vehicle position, a direction, a speed and other data. The data stored in the memory 652 may be used by the computing platform 650.

In the embodiment of the present disclosure, the processor 651 can execute the instruction 653 to complete all or part of the steps of the vehicle control method described above.

Other embodiments of the present disclosure will easily occur to those skilled in the art after they consider the specification and practice the present disclosure. The present disclosure is intended to cover any variations, uses or adaptations of the present disclosure, which follow the general principles of the present disclosure and include common sense or common technical means in the art that is not disclosed in the present disclosure. The specification and examples are to be regarded as illustrative only, while the true scope and spirit of the present disclosure are indicated by the following claims.

It should be understood that the present disclosure is not limited to the precise structure described above and shown in the drawings, and various modifications and changes can be made without departing from its scope. The scope of the present disclosure is limited only by the appended claims.

What is claimed is:

1. A vehicle control method, comprising:
   determining a target yaw rate of a vehicle in response to determining that the vehicle meets a rear wheel turning control condition;
   acquiring a first yaw rate of the vehicle in response to determining that a front wheel of the vehicle turns at a front-wheel maximum turning angle and a rear wheel of the vehicle turns at a rear-wheel maximum turning angle in a turning direction opposite to the front wheel, and a second yaw rate of the vehicle in response to determining that the front wheel turns at the front-wheel maximum turning angle and the rear wheel does not turn;
   determining a magnitude relationship between the first yaw rate and the target yaw rate, and a magnitude relationship between the second yaw rate and the target yaw rate, respectively; and
   controlling the rear wheel of the vehicle according to whether the magnitude relationships meet a preset control condition,
   wherein the method further comprises:
   determining that the magnitude relationships meet the preset control condition in response to determining that the target yaw rate is less than the first yaw rate and the target yaw rate is greater than or equal to the second yaw rate.

2. The vehicle control method according to claim 1, wherein controlling the rear wheel of the vehicle according to whether the magnitude relationships meet the preset control condition comprises:
   obtaining a turning direction of the front wheel of the vehicle, and performing a turning control on the rear wheel of the vehicle at a preset rear wheel turning angle in a direction opposite to the turning direction of the front wheel, in response to determining that the magnitude relationships meet the preset control condition; and
   not performing turning control on the rear wheel of the vehicle, in response to determining that the magnitude relationships do not meet the preset control condition.

3. The vehicle control method according to claim 1, further comprising:
   determining that the magnitude relationships do not meet the preset control condition in response to determining that the target yaw rate is greater than or equal to the first yaw rate, or the target yaw rate is less than the second yaw rate.

* * * * *